United States Patent [19]

Arnold

[11] 4,250,487
[45] Feb. 10, 1981

[54] VEHICLE SPEED RECORDER

[76] Inventor: Robert D. Arnold, 1505 N. Quinn St., Apt. 17, Arlington, Va. 22209

[21] Appl. No.: 955,297

[22] Filed: Oct. 27, 1978

[51] Int. Cl.³ .......................... G01P 1/10; G06F 3/14; G08B 21/00
[52] U.S. Cl. ........................ 340/62; 340/670; 340/706; 340/799; 346/33 D
[58] Field of Search ........... 340/53, 62, 670, 798, 340/799, 706, 722; 346/18, 33 D; 364/424, 438, 565; 324/160, 172

[56] References Cited

U.S. PATENT DOCUMENTS

| 3,345,458 | 10/1967 | Cole et al. | 340/799 X |
|---|---|---|---|
| 3,835,382 | 9/1974 | Weisbart | 340/670 X |
| 3,863,152 | 1/1975 | Eshraghian | 324/166 |
| 3,875,388 | 4/1975 | Luten et al. | 364/424 |
| 3,928,756 | 12/1975 | Auray | 364/424 X |
| 3,968,434 | 7/1976 | Dixon et al. | 324/166 |
| 3,982,101 | 9/1976 | Kalb et al. | 364/565 |
| 3,991,368 | 11/1976 | Powell | 324/166 |
| 4,000,465 | 12/1976 | Sugiyama | 324/166 |
| 4,074,196 | 2/1978 | Webster | 324/166 |
| 4,083,052 | 4/1978 | Metcalf | 346/33 D X |
| 4,092,728 | 5/1978 | Baltzer | 340/799 X |
| 4,093,916 | 6/1978 | Summer | 324/166 |
| 4,093,939 | 6/1978 | Mitchell | 340/62 X |
| 4,104,624 | 8/1978 | Hamada | 340/799 X |
| 4,114,450 | 9/1978 | Shulman et al. | 73/489 |
| 4,124,840 | 11/1978 | Kobayashi | 340/62 X |

Primary Examiner—John W. Caldwell, Sr.
Assistant Examiner—Joseph E. Nowicki
Attorney, Agent, or Firm—Robert D. Arnold

[57] ABSTRACT

Speed data samples from an ordinary digital speedometer are written sequentially into a number of addressed memory locations. Each new entry replaces the oldest entry then in memory. This writing process occurs only when the vehicle is moving, so the memory cannot be erased when the vehicle is at rest. The last writing address used is retained. Any stored data sample may be recalled and displayed by presenting its address. The time-before-vehicle-stop of the displayed recalled data corresponds to the sequential interval between the recalling address and the last-used writing address. In the most convenient modification, the user stepwise specifies the sequential interval and the device produces the appropriate recalling address.

7 Claims, 13 Drawing Figures

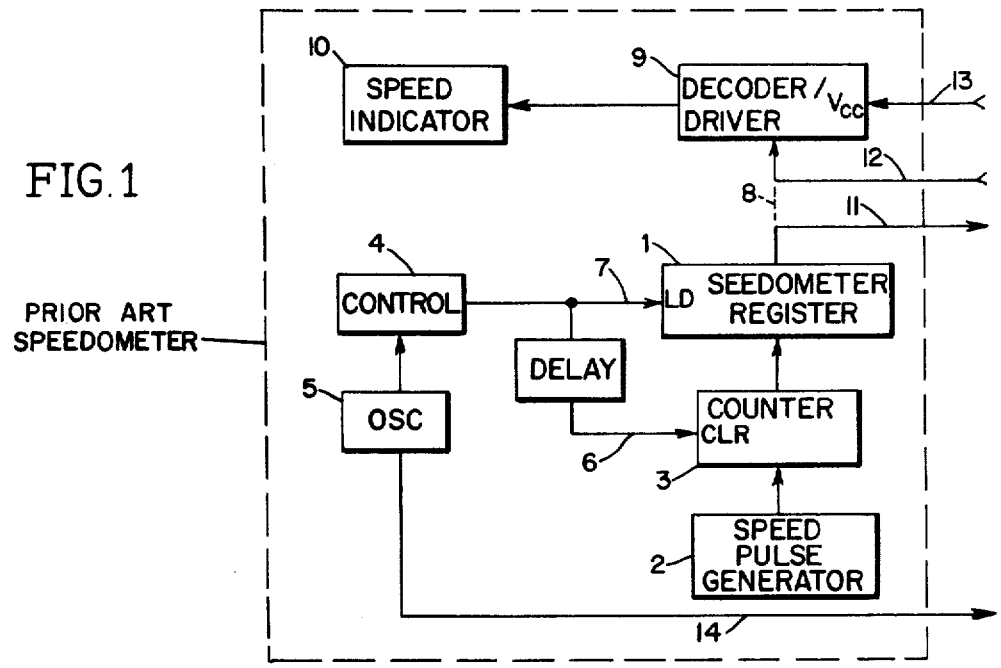
FIG.1 PRIOR ART SPEEDOMETER
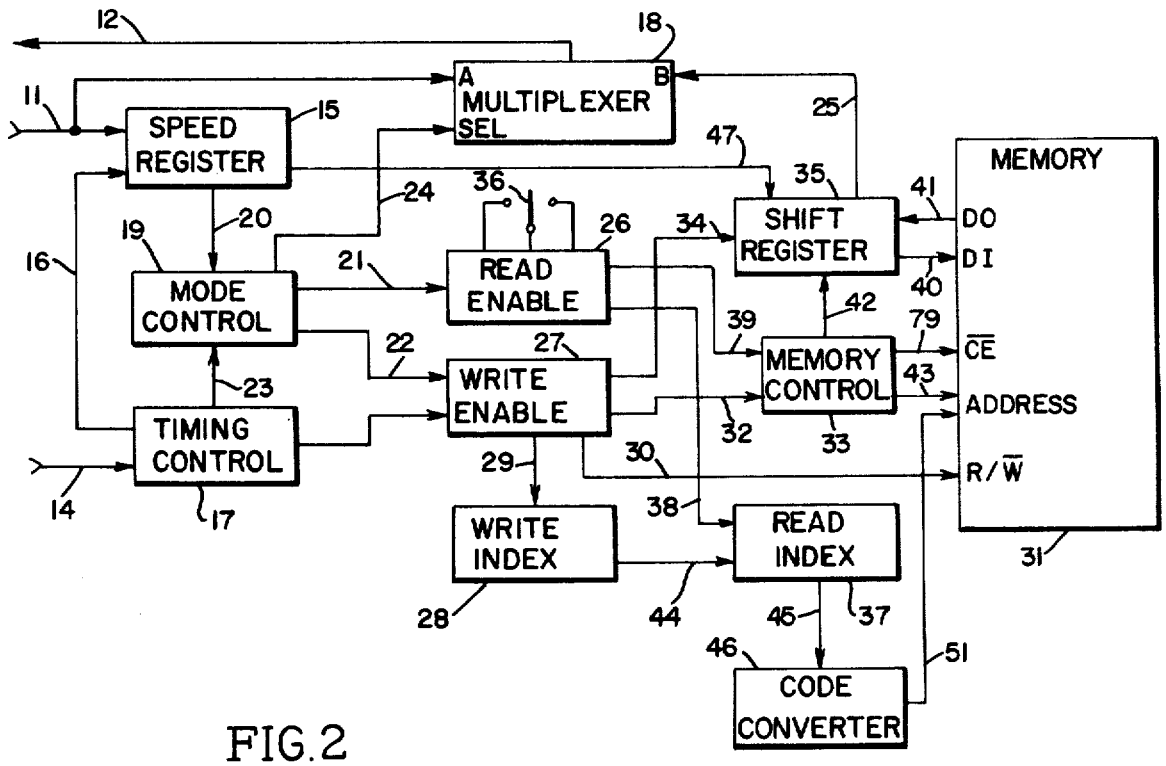
FIG.2

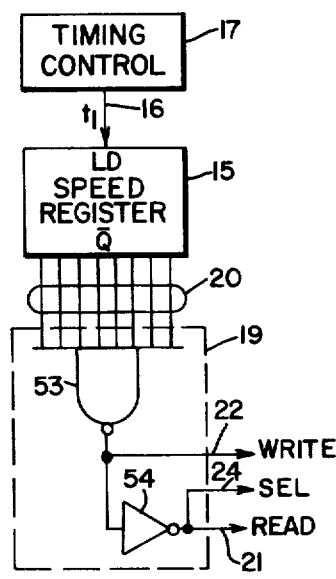
FIG. 5
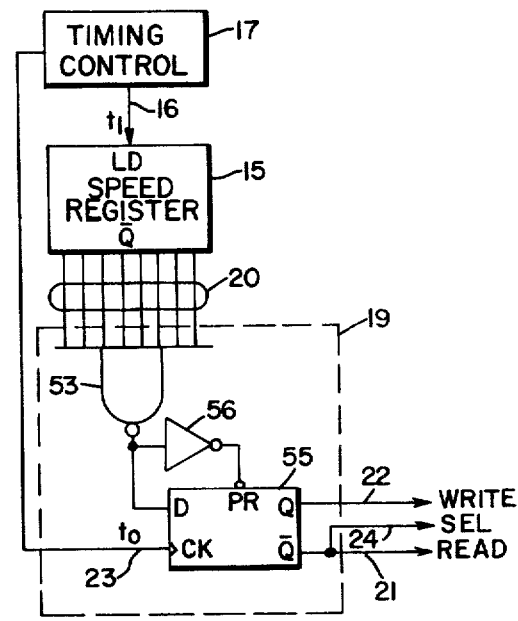
FIG. 6
FIG. 7
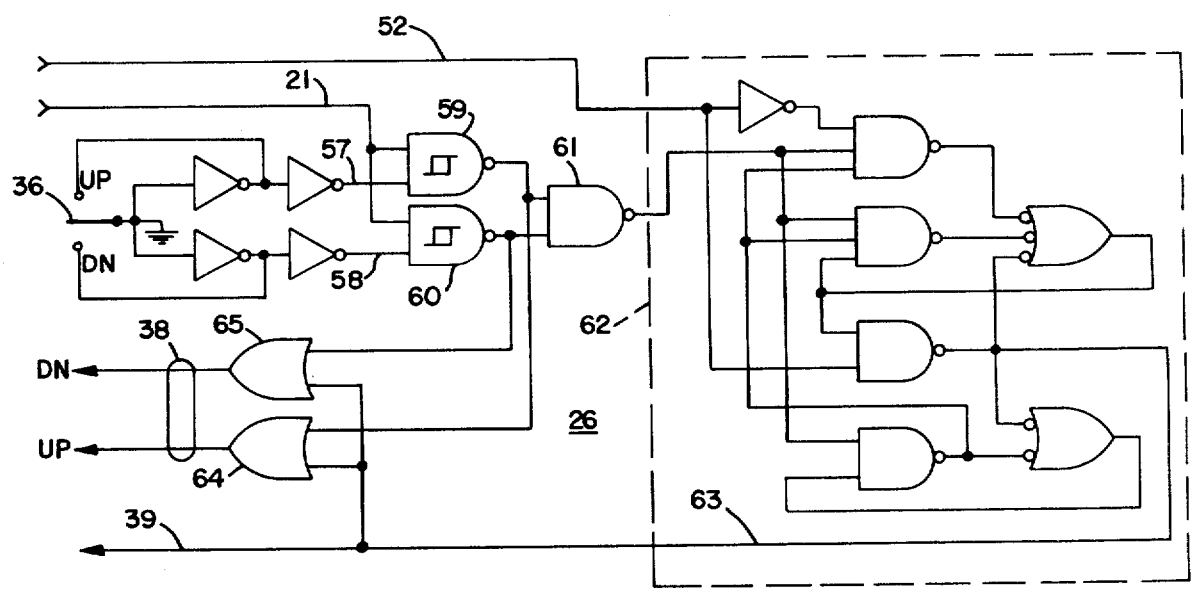

FIG. 8
FIG. 9
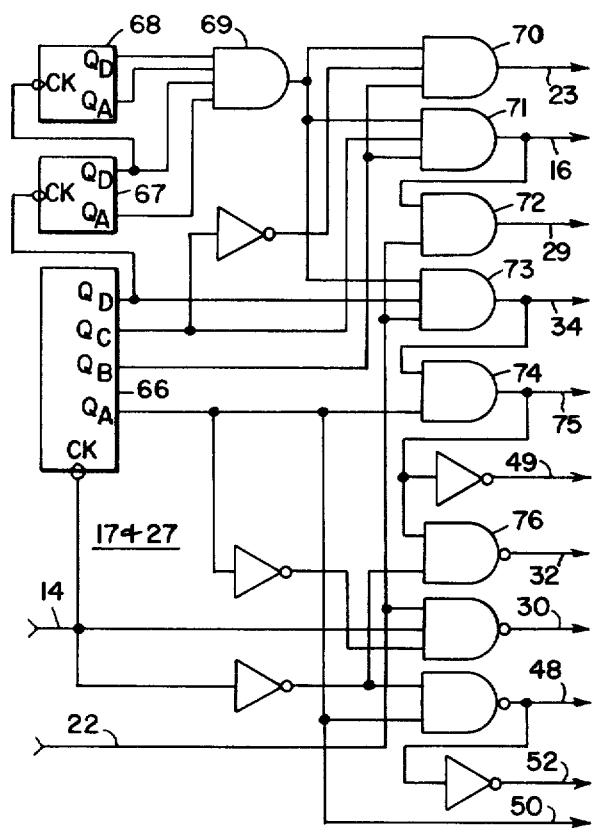
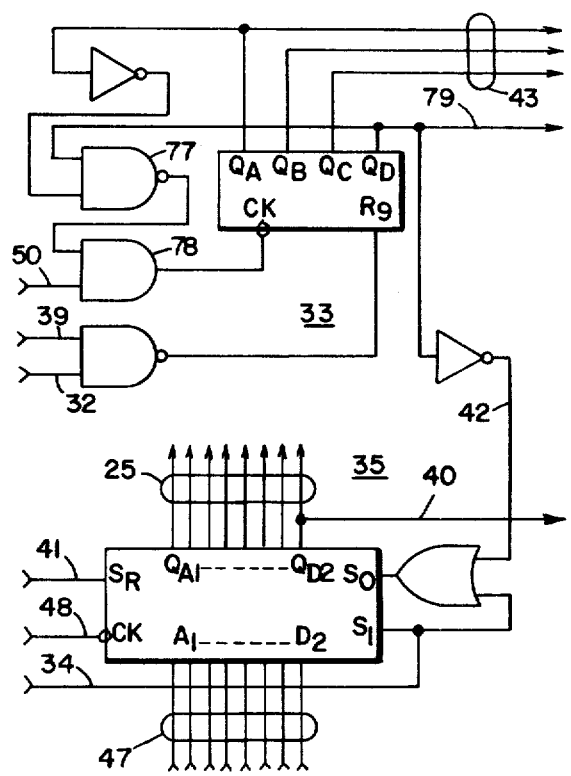
FIG. 10
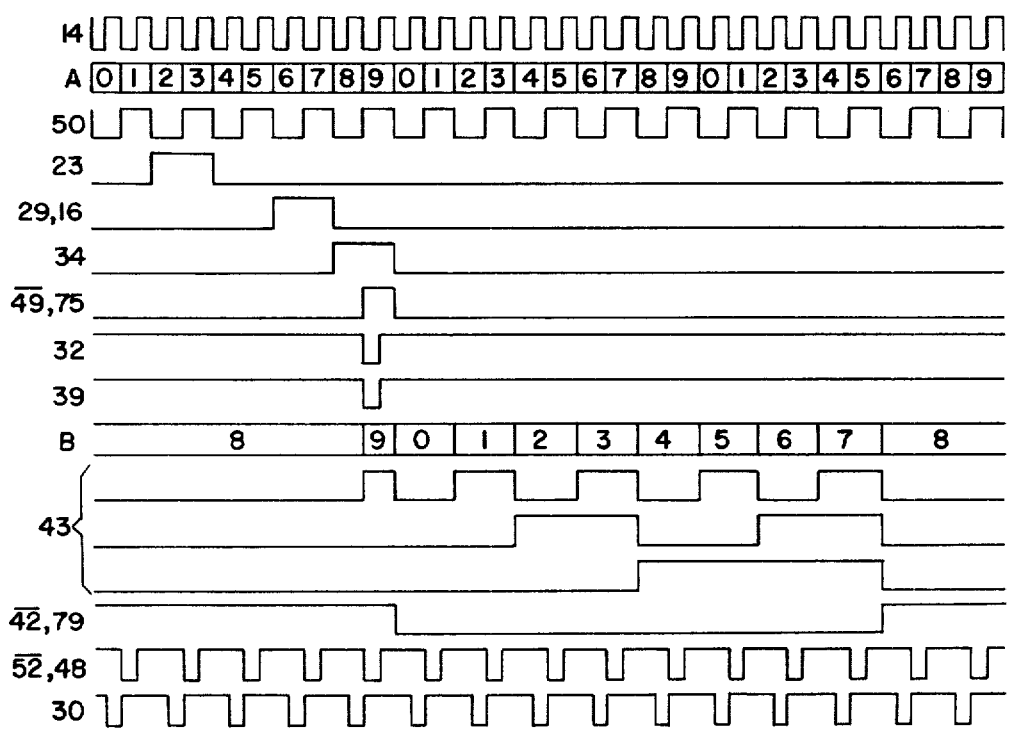

VEHICLE SPEED RECORDER

BACKGROUND OF THE INVENTION

This invention pertains to the field of measuring and indicating vehicular speed, particularly the speed of wheeled vehicles. Within that field it is related to digital speedometers that sense speed by timing a train of electrical pulses that are generated in proportion to wheel rotation. Most specifically, this invention relates to the class of such speedometers in which speed readings are retained for appropriate periods of time, rather than being continually lost as soon as each new speed sample is measured, and in which the retained readings may be recalled and displayed without the aid of any external apparatus. The applicable art in this field includes tachometers, for a device that measures shaft rotation rate can be calibrated to measure the linear speed of a wheeled vehicle.

The invention is also related to tachographs, but differs from known tachographs in that it requires no consumable or removable recording medium, such as paper or magnetic tape, and requires no medium-driving motor.

The prior art provides examples of digital speedometers and tachometers that may be adapted to serve as elements in the present invention. They have in common the inclusion of a digital register that contains the most recently sampled speed. In some, the sampling, which is to say the loading or latching of the register, is accomplished synchronously and at a fixed rate (e.g. Webster, Sugiyama, and Powell). Eshraghian and Summer sample synchronously, the former at a rate determined by rate of change of speed, and the latter at a rate slightly dependent upon speed. Dixon et al sample asynchronously at a rate proportional to speed. In Sugiyama one sample reading is retained and displayed.

SUMMARY OF THE INVENTION

This invention, when installed in a motor vehicle, will record a series of samples of vehicular speed and will, on demand, display any of these recorded speeds together with an unambiguous indication of when these speeds occurred. Recording is automatic, not being subject to human control but rather occurring repeatedly whenever the vehicle is in motion. Erasure of a sample can occur only after available storage capacity is used up, whereupon the newest sample replaces the oldest sample then in storage. Erasure is thus prevented as long as the vehicle is at rest. The length of speed history stored depends upon the storage capacity and the rate of sampling. Any recalled sample is associated with the time that the sample occurred before the vehicle stopped.

The purpose of the invention is to provide a device to assist in speed-limit enforcement and accident investigation. Although technically related most closely to speedometers and tachographs, it is in purpose most closely related to such devices and operations as speed measurement by pacing, speed measurement by radar, and speed reconstruction by length of skid marks. It is therefore with respect to highway safety and enforcement applications that its advantages and disadvantages should be weighed.

It is the object of this invention to provide a vehicle speed recorder that is sufficiently inexpensive, reliable, tamper resistant, and easy to use, that its universal mandatory installation on new motor vehicles can be reasonably considered as a practical and effective means of speed-limit enforcement.

DESCRIPTION OF THE DRAWINGS

FIG. 1 is a block diagram of the essential elements of a prior-art electronic digital speedometer which is a basic element of the present invention;

FIG. 2 is a block diagram of the remaining basic elements, showing schematically the interconnections among the elements;

FIGS. 5 and 6 illustrate two different embodiments of the mode control;

FIG. 7 is a logic diagram of the read enable circuit;

FIG. 8 is a logic diagram of the time control and write enable circuits;

FIG. 9 is a logic diagram of the memory control and shift register circuits;

FIG. 10 shows the waveforms generated by the circuits of FIGS. 7-9;

DETAILED DESCRIPTION OF THE INVENTION

Figure 3:
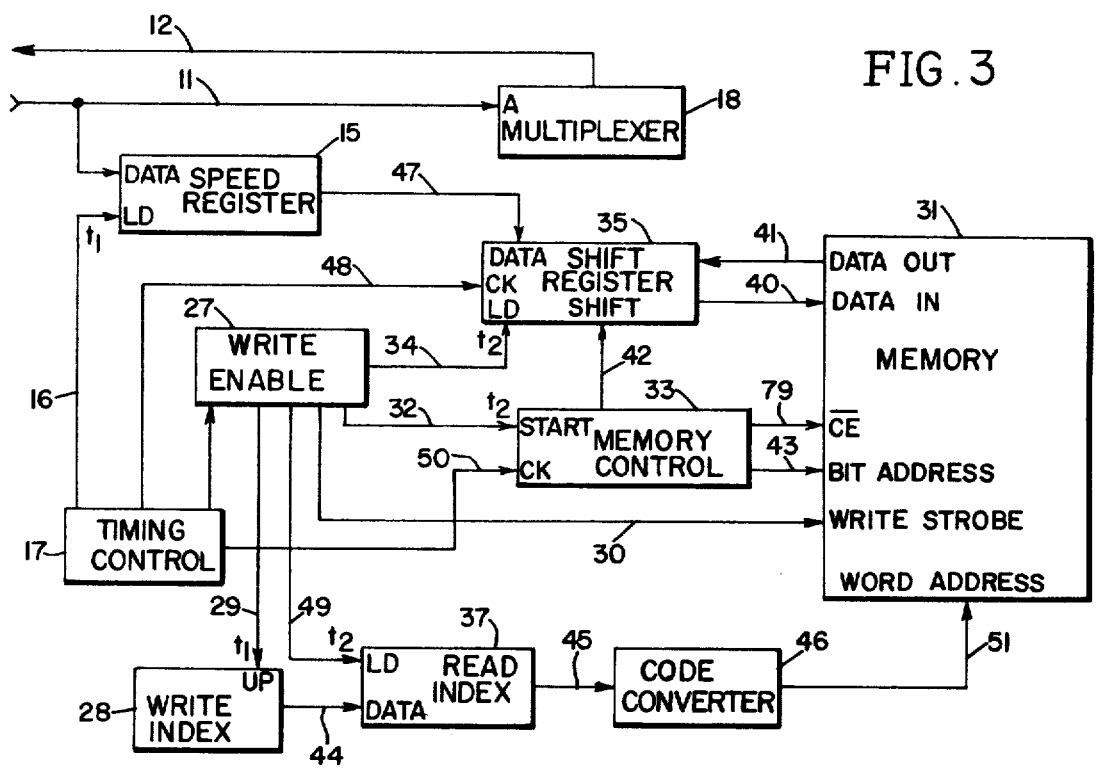
FIGS. 3 and 4 illustrate schematically the operation of those parts of FIG. 2 that function in the write mode and in the read mode respectively.

One of the basic elements of the invention is an electronic digital speedometer, several suitable versions of which may be found in the prior art. FIG. 1 shows the speedometer register 1 that these versions have in common. At any given time it contains digital data corresponding to the most recent speed sample taken. It is typically a bistable latch of an appropriate number of bits, eight bits for two-decade NBCD data. Although the method of sampling varies among versions, the scheme shown in FIG. 1 will suffice for illustrating the interaction of any of these speedometers with the remaining parts of the invention. A pulse generator 2 produces a train of pulses of frequency proportional to vehicle speed. A counter 3 counts these pulses. At suitable times a control circuit 4, driven by a free-running oscillator 5, causes register 1 to be loaded with the data then in counter 3. Shortly thereafter, another signal from control circuit 4 clears counter 3. The counting time, in this version, is the time between a clear signal on line 6 and the next load signal on line 7. The contents of register 1 are continuously presented in parallel on lines 8 to decoder/driver 9 which drives indicator 10. The representation of lines 8 is shown broken to indicate that in applying this speedometer to the present invention, the parallel data from register 1 do not follow that path but rather go out on lines 11, and decoder/driver 9 receives parallel data on lines 12. Line 13 receives power for decoder/driver 9, and line 14 provides a signal from oscillator 5 to be used in timing other parts of the invention.

In FIG. 2, the parallel data on lines 11 are input to speed register 15. This register may consist of a bistable latch like that of speedometer register 1. Separate registers are used so that different sampling rates may be used in the speedometer and in the speed recorder.

Register 15 is loaded at time t₁ by a pulse on line 16 generated by timing control circuit 17 that is synchronized to the speedometer by means of the signal on line 14 from oscillator 5. Time t₁ should occur at a time other than the time of the signal on line 7 that loads speedometer register 1. Depending upon the particular design of the speedometer, the non-coincidence of these two signals may be realized by proper phasing of the pulse on line 16 or by the insertion of a short delay or phase shift in line 14. The parallel data on lines 11 are also input to multiplexer 18 whose parallel output goes on lines 12 back to the speedometer. Parallel data from speed register 15 are fed to shift register 35 on lines 47.

Mode control 19, responsive to data from register 15 on lines 20, has two stable states to be called the read mode and the write mode. In the read mode a logical 1 appears on line 21 and a logical 0 appears on line 22. In the write mode the reverse occurs. The read mode generally occurs when register 15 contains zero speed and the write mode occurs at all other times. However, in the preferred embodiment, the write mode persists for an appropriate length of time after the speed has become zero. This variation, involving a timing signal on line 23, will be explained below in connection with FIGS. 5 and 6. Mode control 19 also selects the output of multiplexer 18 by means of a signal on line 24. The parallel data on lines 11 are selected in the write mode and the parallel data on lines 25 are selected in the read mode.

Mode control 19 activates read enable circuitry 26 by presenting a logical 1 on line 21. The details of read enable circuitry 26 will be explained below in connection with FIG. 7.

Write enable circuitry 27 is activated by a logical 1 on line 22 from mode control 19. It receives and appropriately gates timing pulses from timing control 17. In the preferred embodiment, the timing control 17 and the write enable circuitry 27 are combined into one circuit that will be described below in connection with FIG. 8.

Write enable circuitry 27 provides properly timed signals to several components of the invention. It activates write index 28, which is a first indexing means, by a pulse on line 29. It provides a write strobe on line 30 to memory 31. It provides a starting signal on line 32 to memory control 33. It provides a load signal on line 34 to shift register 35.

Read enable circuitry 26, in response to a signal from manual switch 36, activates read index 37, which together with switch 36 constitutes a second indexing means, by a pulse on one of lines 38 and starts memory control 33 by a pulse on line 39.

Shift register 35 provides serial data to memory 31 on line 40 and receives serial data on line 41. Memory control 33 puts shift register 35 into the shift mode by a pulse on line 42, provides bit address data to memory 31 on lines 43, and enables the memory by a signal on line 79. Word address data are fed from write index 28 to read index 37 on lines 44, and from there to memory 31 on lines 45 via code converter 46 and lines 51.

Detailed descriptions of memory control 33 and shift register 35 will be given below in connection with FIG. 9. The discussion of FIG. 11 will provide details of write index 28, read index 37, code converter 46, and memory 31.

The above discussion serves to identify the basic components of the invention and to show their interconnections. An explanation of the operation of the invention is best accomplished by separately considering the operation in the read mode and in the write mode.

FIG. 3 illustrates those components and connections of FIG. 2 that are active when the system is in the write mode. Additional detail is provided by showing line 48 which furnishes the clock signal to shift register 35, line 49 which furnishes the load signal to read index 37, and line 50 that furnishes a clock signal to memory control 33.

Multiplexer 18 causes speed data from the speedometer on lines 11 to be returned to the speedometer on lines 12. Thus, in this mode, speedometer indicator 10 is updated at times specified by speedometer control 4 and is quite independent of the timing of the recorder.

The timing and operation of the recorder is as follows. At time t₁ timing control 17, by a pulse on line 16, causes speed register 15 to be loaded with data from speedometer register 1 on lines 11. Time t₁ occurs periodically at the rate of recording, typically every second or few seconds depending upon the selected design. At the same time t₁ write enable circuit 27, by a pulse on line 29, increments write index 28, which is a counter. This establishes the index of the speed data just loaded and will provide the word address at which it is to be stored in memory 31. At time t₂, which occurs a few milliseconds or less after t₁, write enable circuit 27 causes three actions. It loads shift register 35 with data from speed register 15; it starts memory control 33, which is a self-stopping counter; and it loads read index 37 with data from write index 28. This last action is to assure that when the vehicle stops and the read mode is established, the read index will contain the last address generated by the write index.

At this point memory control 33 takes over. It has a number of active states equal to the number of bits in the speed data. Eight-bit NBCD would be typical and is assumed in this embodiment. After starting, memory control 33, clocked by a signal on line 50, enters its first active state. It generates a signal on line 42 that puts shift register 35 into the shift mode, and this signal persists throughout the eight active states. A bit address corresponding to the first state is presented to memory 31 on lines 43. During this state, a strobe on line 30 causes memory 31 to record the data bit then at the serial output of shift register 35 at the address represented by the word address then contained in read index 37 and the bit address presented by memory control 33. Then, synchronized to follow the strobe on line 30, a clock pulse on line 48 causes shift register 35 to present the second data bit at its serial output. Then memory control 33 enters its next state and the second data bit is recorded in the same manner. After all eight bits are recorded, memory control 33 enters an inactive state, cuts off the shift mode of shift register 35, cuts itself off, and awaits the next starting signal on line 32. The recording cycle is complete. Note that shift register 35 now contains the same data as when the recording cycle began because the output of memory 31 is connected to the serial input of shift register 35. The combination of write enable circuitry 27, shift register 35, and memory control 33 may be called a writing means.

Figure 4:
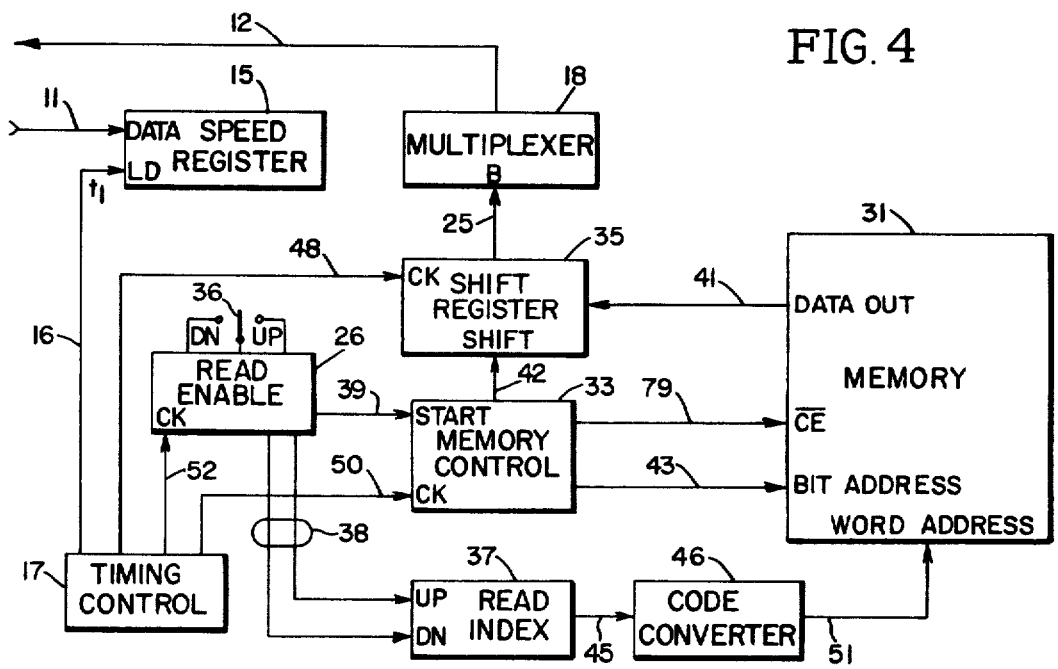

FIG. 4 illustrates those components and connections of FIG. 2 that are active when the system is in the read mode. Additional detail is provided by showing line 52 that provides a synchronizing signal to read enable circuitry 26, and lines 48 and 50 that appeared also in FIG. 3. Also, lines 38 from read enable 26 are revealed as a pair.

The only timing pulse shown in the read mode is the pulse at $t_1$ on line 16 that loads register 15 from lines 11. This periodic pulse must continue to be active in the read mode in order that an indication of non-zero speed appearing on speedometer register 1 will be transferred to register 15 which in turn will cause a change to the write mode by means of a signal on lines 20, shown in FIG. 2.

Recall that shift register 35 contains the last speed data recorded in the write mode and read index 37 contains the address corresponding to those data. Multiplexer 18 is presenting those data to speedometer indicator 10 via lines 12. Speedometer register 1 is completely isolated from speedometer indicator 10.

The actual reading operation is initiated by momentarily closing one of the two sets of contacts in switch 36, a SPDT neutral-center switch. Closure in one direction will cause read index 37, an up/down counter, to be incremented once and closure in the other direction will cause it to be decremented once by means of a pulse on the appropriate one of lines 38. In either case, a pulse on line 39 will start memory control 33. Although switch operation is necessarily asynchronous, a synchronizing signal on line 52 is used to cause the start signal on line 39 to be synchronous with the memory control clock on line 50. Once memory control 33 has started, it and shift register 35 proceed just as they did in the write mode. The difference is that, in the absence of any write strobe to memory 31, the contents of memory are not changed. The contents at the address now held by read index 37 are transferred, bit by bit as memory control 33 runs, into shift register 35 on line 41. Multiplexer 18 will cause these newly read data to appear on speedometer indicator 10 via lines 25 and lines 12. Since the data transfer requires at most a few milliseconds, there is no possibility of operating switch 36 too rapidly nor is there any significant confusion in having the speedometer indicator display the shifting numbers during transfer. Recall that the vehicle is at rest during this reading transfer. It would nevertheless be a simple matter to blank the indicator during transfer by applying the inverse of the signal on line 42 to the blanking input of decoder/driver 9.

From the above description of the read mode operation, it is apparent that any of the contents of memory 31 may be displayed by successively decrementing read index 37 by means of switch 36. Contents of memory may be reselected by incrementing read index 37. It is further apparent that the time-before-vehicle-stop corresponding to the currently displayed speed data is equal to the difference between number of decrementing steps and the number of incrementing steps multiplied by the time between successive recording samples. A means of directly displaying this difference will be given below in connection with the discussion of FIG. 12.

The combination of read enable circuitry 26, shift register 35, and memory control 33 may be called a reading means. In this embodiment, the writing means and the reading means have shift register 35 and memory control 33 in common.

Turning now to circuit details of the components discussed above, we see in FIG. 5 one embodiment of mode control 19. Speed register 15 is the equivalent of a pair of Texas Instruments SN54L75 4-bit bistable latches. It accommodates the eight bits of the two-decade NBCD coding assumed for speed data. It has inverse outputs, $\overline{Q}$, which are all connected to the inputs of NAND gate 53. A logical O will appear on line 22 only when all eight of lines 20 are at logical 1, corresponding to decimal 00 in register 15. Inverter 54 will cause a logical 1 on line 21 at such times. Any non-zero speed in register 15 will cause at least one of lines 20 to go to logical 0 whereupon logical 1 will appear on line 22 and logical 0 on line 21. Mode can change only at time $t_1$ when timing control 17 causes register 15 to load from speedometer register 1.

FIG. 6 shows the preferred embodiment of mode control 19. The write output, on line 22, is connected to the Q output of D-type flip-flop 55, equivalent to half of a Texas Instruments SN54L74. Line 21, the read output, is connected to the $\overline{Q}$ output. Any non-zero speed in register 15 will cause logical 1 on the output of gate 53 and, because of inverter 56, logical 0 at the preset input to flip-flop 55, thus causing logical 1 immediately to appear on line 22. Now consider the operation that ensues when register 15 is loaded at $t_1$ with data corresponding to zero speed. A logical 1 will appear at the preset input, having no effect. A logical 0 will appear at the D input and it will have no effect until flip-flop 55 is clocked by a signal on line 23, at which time line 22 will go to logical 0 and line 21 to logical 1. The purpose is to delay the establishment of the read mode until there has been time for the zero speed, that caused the logical 0 on the D input, to be recorded in memory. This delay is accomplished by causing the clock pulse on line 23 to occur at a time $t_0$ which does not arrive until just before the next occurrence of $t_1$. Although a pulse appears on line 23 at $t_0$ each sampling period, it has no effect except when Q=1 and D=0. The condition Q=0 and D=1 is not possible since at 1 at D will be accompanied by a 0 at preset which will have converted Q to 1. The reason for recording the zero speed is simply to cause the zero speed to be displayed after the vehicle has stopped and the read mode has been established, thus disconnecting speedometer indicator 10 from speedometer register 1 and connecting it to shift register 35. As was pointed out in the discussion of FIG. 3, shift register 35 will at this time contain the last speed data recorded.

FIG. 7 shows the details of read enable circuitry 26. SPDT switch 36 is spring-loaded to be normally at its neutral center position as shown. A voltage corresponding to logical 0 appears on lines 57 and 58, which are inputs to gated Schmitt triggers 59 and 60. Operating the switch so as to ground momentarily the UP contact causes a pulse to appear on line 57 of amplitude corresponding to logical 1. The pulse will have no effect unless line 21, from mode control 19, is at logical 1, which is the case only in the read mode. In this case, a sharp-edged negative pulse of length equal to switch contact time will appear at the output of trigger 59. Momentarily grounding the DN contact will similarly caused a negative pulse at the output of trigger 60. A negative pulse from either trigger 59 or trigger 60 will cause a positive pulse of the same length to appear at the output of NAND gate 61. This pulse, together with a clock signal on line 52 from timing control 17, enters synchronizer 62, the output of which is a single short synchronized negative pulse on lines 63 and 39 occurring soon after the beginning of the long pulse at gate 61 output. Synchronizer 62 is essentially the circuit of Texas Instruments synchronizer SN54120, slightly simplified because only one mode of operation is required. The pulse on line 63 is input to OR gates 64 and 65 which are also fed respectively by the outputs of triggers 59 and 60. The result is a short synchronized negative pulse on the UP wire of line 38 if switch 36 has grounded its UP contact, and a similar pulse on the DN wire if the DN contact was grounded.

FIG. 8 shows the combined timing control 17 and write enable circuitry 27. The signal from speedometer oscillator 5 arrives on line 14 and drives cascaded counters 66, 67, and 68. The number of counters required and their moduli depend upon the frequency of oscillator 5 and the desired recorder sampling frequency. In this example the sampling frequency is to be 1/1000th of the oscillator frequency, so three decade counters, equivalents of Texas Instruments SN54L90s, are used. The most and least significant bits of counters 67 and 68 are ANDed in gate 69 whose output is therefore at logical 1 for the last 1/100th of the sampling period. All of the timing pulses fall within this time and their particular times of occurrence are determined by decoding the outputs of the least significant decade, counter 66. AND gate 70 decodes decimal states 2 and 3, producing a pulse at $t_0$ on line 23. Gate 71 decodes states 6 and 7, producing a pulse at $t_1$ on line 16. The $t_1$ pulse is also gated by gate 72 to produce a pulse on line 29 when a logical 1 on line 22 from mode control 19 indicates that the system is in write mode. The remaining four timing pulses are all write-mode gated and occur generally at $t_2$, though pulse lengths and polarities differ according to how they are to be used. Gate 73 decodes states 8 and 9 for a pulse on line 34. Gate 74 decodes state 9 for a positive pulse on line 75 and an inverted pulse on line 49. Gate 76, ANDed with the inverse of the oscillator signal on line 14, produces a narrower pulse on line 32.

The circuit also produces four clocking waveforms, output on lines 30, 48, 52, and 50. The waveforms are shown in FIG. 10. One of these four, the write strobe to memory 31 on line 30, is write-mode gated.

FIG. 9 illustrates circuitry that may be used for memory control 33 and shift register 35. The former is based on a decade counter, equivalent to a Texas Instruments SN54L90, employed as a cycle counter. When the counter is in state decimal 8 gates 77 and 78 cut off the clock signal on line 50. A starting signal on line 39 from read enable circuitry 26 or on line 32 from write enable circuitry 27 sets the counter to state 9 which enables the clock. The counter then counts through states 0 through 7, which are referred to as active states, and then stops when it again reaches state 8. The output on line 42 is the inverse of the MSB of the counter and is therefor at logical 1 throughout the active states. During this time the output of the three LSBs on lines 43 run through the binary codes of states 0 through 7. Lines 43 provide the eight bit addresses to memory 31.

Shift register 35 comprises a cascaded pair of 4-bit serial-in, serial-out, parallel-in, parallel-out shift registers equivalent to Texas Instruments SN54LS194A. The logical 1 on line 42 during the active states of memory control 33 puts shift register 35 into the shift mode. Shifting is clocked by a signal on line 48 from timing control 17. The rightmost bit in the register is constantly presented to the data-in terminal of memory 31 on line 40, and the data-out terminal of memory is connected to the shift-right serial data input of the register on line 41. The register is parallel loaded on lines 47 from speed register 15 when a load signal arrives on line 34 from write enable circuitry 27. Parallel output is constantly presented on lines 25 to one of the two sets of inputs to multiplexer 18, the other set of inputs being received on lines 11 from speedometer register 1. Multiplexer 18 is the equivalent of a pair of Texas Instruments SN54L157.

FIG. 10 shows the timing waveforms generated by the circuits in FIGS. 7, 8, and 9. Each waveform is designated by the reference numeral of the line on which it appears. Also shown are the decimal states, designated "A", of counter 66 (FIG. 8), which is part of timing control 17, and the decimal states, designated "B", of the counter used in memory control 33 (FIG. 9). Note that three different waveforms bear the common designation 43. It is immaterial which of these waveforms appears on which of the three lines 43 (though each must appear on one of the lines) because lines 43 are connected to interchangeable address code inputs of memory 31.

All of the waveforms in FIG. 10 are synchronous with the oscillator signal on line 14. However, the pulse on line 39 can occur at any time during the sampling period. Its position in FIG. 10 has been arbitrarily chosen to show its relationship to the pulse trains on lines 42 and 43, which are shown as though they had been started by the pulse on line 32. Recall that lines 42 and 43 are the outputs of memory control 33, which may be started by a pulse on line 32 from write enable circuitry 27 or a pulse on line 39 from read enable circuitry 26.

Figure 11:
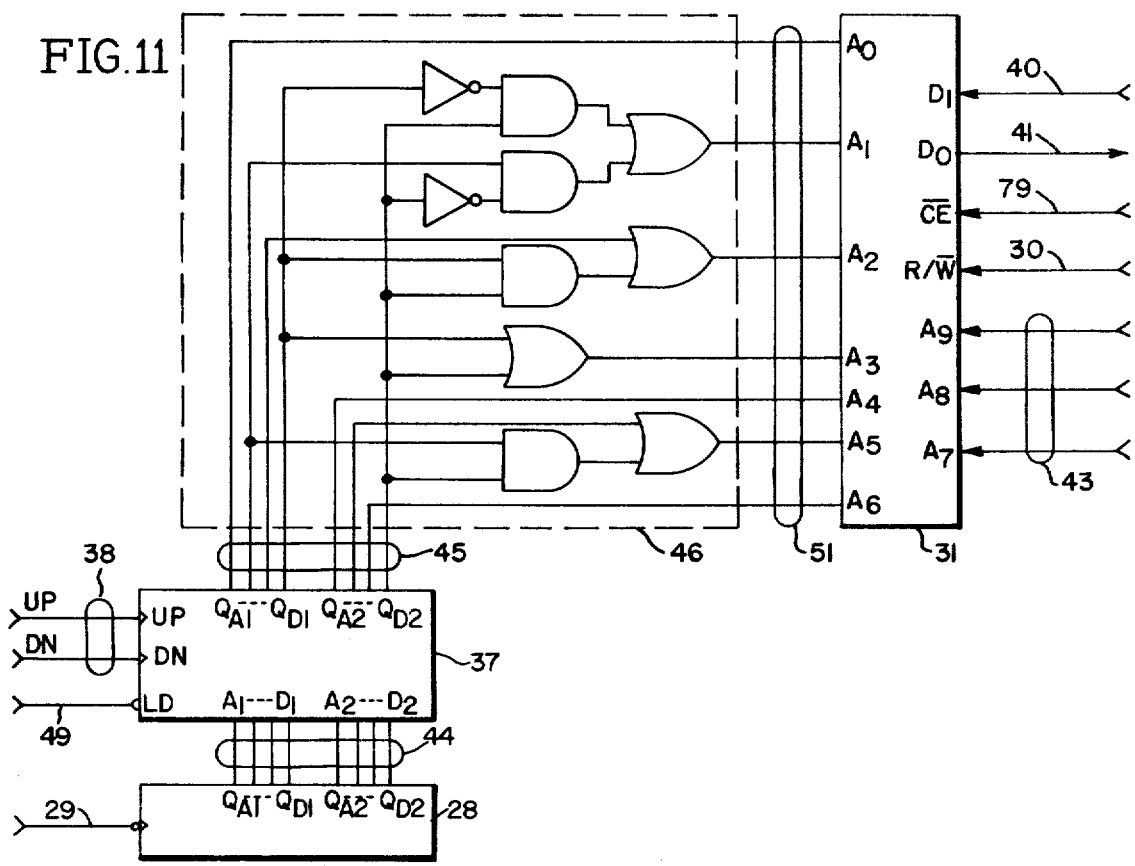
FIG. 11 contains a logic diagram of the read and write index generators and the code converter, and also shows the input and output connections to the memory.

FIG. 11 illustrates circuitry that may be used for write index 28, read index 37, code converter 46, and memory 31. Write index 28 is the equivalent of a cascaded pair of Texas Instruments SN54L90 decade counters. It is incremented each time a pulse is received on line 29 and it has a modulus of one hundred. Read index 37 is the equivalent of a cascaded pair of Text Instruments SN54L192 up/down decade counters. It is parallel loaded on lines 44 each time a pulse is received on line 49. It is incremented when a pulse arrives on the UP line of lines 38 and decremented by a pulse on the DN line. Its modulus is also one hundred. Recall that line 49 can be active only in the write mode and lines 38 only in the read mode.

Read index 37 provides the word address to memory 31, which is a 1024×1 bit random access memory, the logical equivalent of Intel 2102A. Being NBCD coded, read index 37 expresses its 100 address words in eight bits. Another three address bits are required for the eight bits in the NBCD speed data that are to be stored. But memory 31 has only ten address code inputs. It is therefore necessary, when using the coding and components shown in the above illustration of the invention, to convert the 8-bit words on lines 45 to 7-bit words on lines 51. Code converter 46 does this by dropping the MSB of words decimal 00 through 79 and converting words 80 through 99 to arbitrary but distinct 7-bit binary words that each correspond to one of the unused states of the NBCD code for 00 through 79. Other forms of index coding and memory address coding could be employed without changing the nature of this invention.

The remaining three address code inputs of memory 31 are connected to lines 43 and the chip enable input to line 79, all from memory control 33 (FIG. 9). The read/write input on line 30 is from write enable circuitry 27 (FIG. 8). Serial data in and out are connected by lines 40 and 41 to shift register 35.

This completes a detailed description of an embodiment of the basic invention, a device that records speed automatically when the vehicle in which it is installed is moving and displays stored speed on manual command, in a manner that allows correlation between the displayed speed and the time that it was recorded, when the vehicle is at rest. There are, however, additional features that may be added to make the device more convenient and useful.

Figure 12:
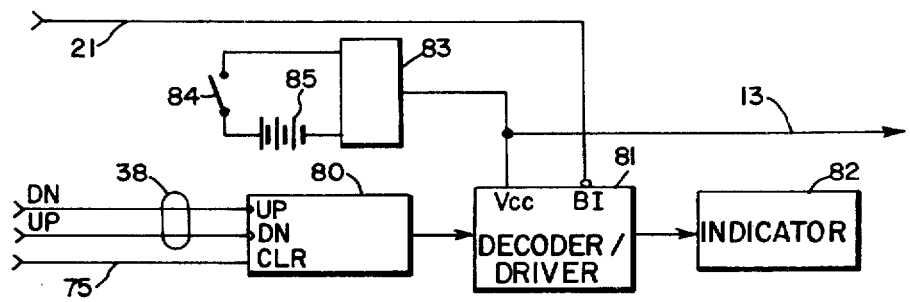
FIG. 12 shows the time-before-stop display means and the means for generating its input.

FIG. 12 illustrates components that may be added to cause direct display of a number that corresponds to the time interval between when the displayed speed was recorded and when the vehicle stopped. Up/down counter 80, the equivalent of a cascaded pair of Texas Instruments SN54L192 decade counters, has the same modulus as write index 28 and read index 37. It is cleared at time $t_2$ in the write mode by a pulse on line 75 from write enable circuitry 27 (FIG. 8). Since read index 37 is loaded at $t_2$ with the data then in write index 28, counter 80 then contains the difference, which is zero. In the read mode, counter 80 is incremented by a pulse on the DN line of lines 38 from read enable circuitry 26 and is decremented by a pulse on the UP line. It thus steps up each time read index 37 steps down and vice versa. Since write index 28 remains constant in the read mode and since at the onset of this mode counter 80 contained zero and indexes 28 and 37 contained identical numbers, counter 80 will contain the difference as index 37 is stepped. The corresponding time interval is this difference multiplied by the recorder sampling period, which period will be known to the user. The contents of counter 80 are parallel fed to decoder/driver 81 which drives a second indicator 82. This second indicator is blanked when the vehicle is moving by the logical 0 that is on line 21 from mode control 19 in the write mode.

To conserve vehicle battery charge when the vehicle is not in use, a separate power supply 83 may be provided for the two indicators. Line 13 provides power to decoder/driver 9. Switch 84 that connects vehicle battery 85 to power supply 83 is open when vehicle ignition is off. If further battery charge conservation is desired, a stand-by power system that is just sufficient to preserve the contents of memory 31 and of registers 28, 37, and 80 could be provided. Still further conservation would be afforded by the provision of a timer that starts at the onset of the read mode and that cuts off stand-by power at the end of its run.

Figure 13:
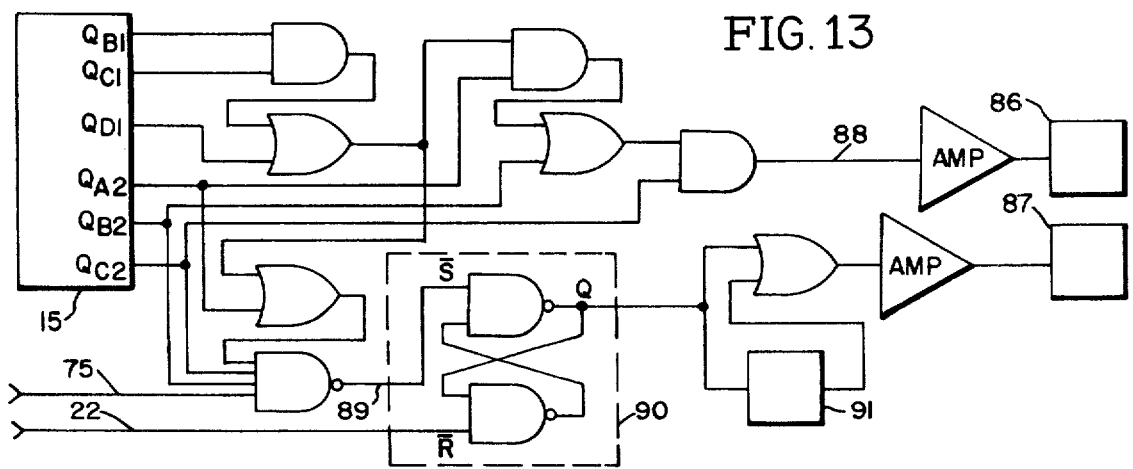
FIG. 13 is a logic diagram of the warning light and enforcement light circuitry.

FIG. 13 illustrates a warning light 86 that informs the vehicle driver that he is recording a speed in excess of the national limit, and an enforcement light 87 that indicates that the vehicle has exceeded some fixed specified speed. Assuming that speed register 15 contains 8-bit NBCD code for speed in miles per hour, the decoding arrangement shown in FIG. 13 causes a logical 1 to appear on line 88 at speeds 56 through 79 mph. At speeds 66 through 79 a logical 0 appears on line 89 when a positive strobe pulse arrives on line 75 from write enable circuitry 27 (FIG. 8). The purpose of the strobe, which is at time $t_2$, is to prevent actuation of light 87 by transients that may occur during loading of speed register 15. The negative pulse on line 89 sets $\overline{SR}$ latch 90 and this latch remains set until line 22 from mode control 19 goes to logical 0 with the onset of the read mode. The reset of latch 90 starts a positive pulse from timer 91, a Signetics SE555 or equivalent with an input differentiator and appropriate external timing resistor and capacitor. Light 87 is turned on when logical 1 is output from either latch 90 or timer 91. Different speed regimes may be selected by the design of the decoding arrangement, but the arrangement should be unalterable after manufacture.

The above described embodiment of the invention assumes speed data in two-decade NBCD and assumes an address index modulus of one hundred. There should be no reason to change the format of the speed data. Two digits are necessary and the third is not needed. There would be no disruption caused to the recorder if the vehicle did exceed 99 mph. It would simply record, and the speedometer would display, the actual speed minus 100 and this would cause no confusion. Even in the case of speed data in kilometers-per-hour there would be no necessity for a third digit, but were one desired the appropriate design change would be obvious from the above description.

The index modulus, however, is an important design consideration. It is equal to the length of the speed record in terms of number of samples, and its product with the sampling period is equal to the length of the speed record in time. Sampling period determines the resolution of the record; urban enforcement considerations would dominate its selection. Time length of the record determines the time available to stop an offender and obtain evidence of illegal speed; highway enforcement may dominate here. The required time length of the record divided by the sampling period is equal to the required index modulus, and the bit capacity of the memory is this modulus multiplied by the number of bits in which speed is expressed. If these considerations lead to a larger index modulus and a larger memory capacity than is represented in the described embodiment, the required design changes are straightforward and obvious.

The foregoing discussion describes an embodiment of the invention that could be constructed using commercially available integrated circuits and gates. Where particular ICs have been cited as examples, low power versions have been specified because low power is important to minimize vehicle battery drain when the vehicle is idle. Low ambient temperature versions have been specified because the device must not be damaged by operation in any environment that a motor vehicle is likely to encounter. Propagation speed requirements are minimal and are easily met by existing semiconductor components. The logical operations represented by the above described embodiment can be realized by other ICs and by other, equivalent, circuit arrangements. For example, much larger scale integration than is represented by the exemplary ICs cited above would afford significant cost reduction, since this invention, by its nature, would have to be manufactured in very large quantities to have any impact on highway safety, its prime object. Among present semiconductor technologies, the CMOS technology would be advantageous both because of its low power dissipation and its wide tolerance for supply voltage level.

While any vehicle speedometer should be designed to resist normal road shock, there is an additional design consideration in the case of the present invention. The better the memory and the reading means are able to resist the shock of a collision, the more effective will be the device in accident investigation. Balancing this added effectiveness against the cost of improved shock resistance is an important design consideration.

I claim:
1. A vehicle speed recorder, comprising:
   (a) a speedometer that includes an electronic register containing digital speed data;

(b) a memory for storing in addressed locations a plurality of speed data samples from the speedometer register;

(c) mode control means, responsive to a signal from the speedometer register and having a write mode and a read mode, for controlling the transfer of data to and from said memory;

(d) first indexing means, made operable by a signal from said mode control means only in the write mode, for repeatedly generating the next member of a cyclic sequence of addresses that correspond to the addresses of said memory, whereby the last address so generated is retained until the next address is generated;

(e) writing means, initiated each time said first indexing means generates a new address, for transferring data from the speedometer register to the location in said memory whose address corresponds to that new address, whereby the data in any given location are retained there until new data are transferred to that location;

(f) a speed indicator for displaying speed data selected from said memory;

(g) second indexing means, connected to said memory and having first and second manual actuators that are made operable by a signal from said mode control means only in the read mode, for generating any selected member of the cyclic sequence of addresses, wherein in response to a signal from said writing means said second indexing means selects the address generated by said first indexing means each time a new address is so generated, wherein in response to the first manual actuator said second indexing means selects the next member of the cyclic sequence of addresses, and wherein in response to the second manual actuator said second indexing means selects the preceding member of the cyclic sequence of addresses, whereby at the onset of the read mode said second indexing means will contain the address last generated by said first indexing means and, as long as the read mode prevails, the address contained in said second indexing means may be stepped forward or backward by means of the first or second manual actuators respectively; and (h) reading means, made operable by a signal from said mode control means only in the read mode, for nondestructively transferring data to said speed indicator from the location in said memory whose address corresponds to the address currently selected by said second indexing means.

2. A recorder as in claim 1, further comprising:

(i) a counter that is caused by a signal from said writing means to be set to zero each time said first indexing means operates, that is decremented by a signal from the first manual actuator, and that is incremented by a signal from the second manual actuator; and (j) a time-back indicator for displaying the contents of said counter, whereby said time-back indicator will display the interval, in the cyclic sequence of addresses, between the address currently selected by said second indexing means and the address last generated by said first indexing means.

3. A recorder as in claim 2 wherein a signal from said mode control means blanks said time-back indicator when said mode control means is in the write mode.

4. A vehicle speed recorder, comprising:

(a) a speedometer that includes an electronic register containing digital speed data;

(b) a memory for storing in addressed locations a plurality of speed data samples from the speedometer register;

(c) mode control means, having a write mode and a read mode, for controlling the transfer of data to and from said memory, wherein said mode control means, responsive to a signal from the speedometer register, switches to the write mode whenever the speedometer register contains nonzero speed data and switches to the read mode, after a delay sufficient to allow one speed data sample to be stored in said memory, when the speedometer register contains zero speed data;

(d) first indexing means, made operable by a signal from said mode control means only in the write mode, for repeatedly generating the next member of a cyclic sequence of addresses that correspond to the addresses of said memory, whereby the last address so generated is retained until the next address is generated;

(e) writing means, initiated each time said first indexing means generates a new address, for transferring data from the speedometer register to the location in said memory whose address corresponds to that new address, whereby the data in any given location are retained there until new data are transferred to that location;

(f) a speed indicator for displaying speed data selected from said memory;

(g) second indexing means, connected to said memory, for generating any selected member of the cyclic sequence of addresses; and (h) reading means, made operable by a signal from said mode control means only in the read mode, for nondestructively transferring data to said speed indicator from the location in said memory whose address corresponds to the address currently selected by said second indexing means.

5. A recorder as in claim 4, further comprising:

(i) interval determining means, responsive to signals from said writing means and said second indexing means, for generating a number corresponding to the interval, in the cyclic sequence of addresses, between the address currently selected by said second indexing means and the address last generated by said first indexing means; and (j) a time-back indicator for displaying the number generated by said interval determining means.

6. A recorder as in claim 5 wherein a signal from said mode control means blanks said time-back indicator when said mode control means is in the write mode.

7. A recorder as in claims 1 or 4, further comprising:
enforcement signal means, responsive to a signal from the speedometer register, for indicating that said vehicle has exceeded a specified speed; and
means, responsive to a signal from said mode control means, for deactivating said enforcement signal means after a fixed time interval after said vehicle stops.

* * * * *